No. 741,532. PATENTED OCT. 13, 1903.
P. J. McLAUGHLIN.
COMBINED HEATING AND ILLUMINATING LAMP.
APPLICATION FILED MAR. 9, 1903.
NO MODEL.
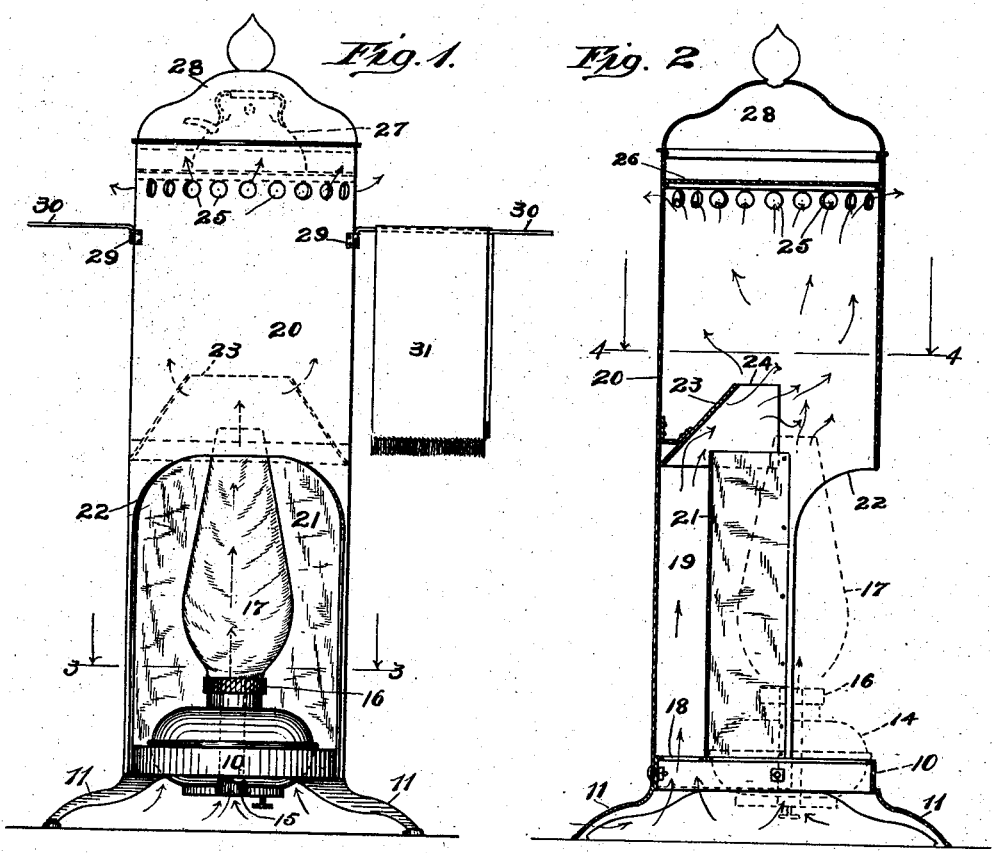
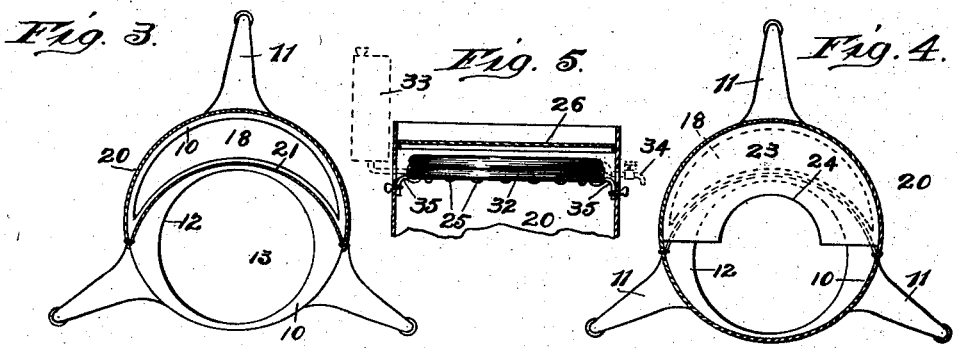
Witnesses:
Chas. E. Gorton
A. Gustafson
Inventor:
Patrick J. McLaughlin
By Chas. A. Tillman
Atty No. 741,532. Patented October 13, 1903.

UNITED STATES PATENT OFFICE.

PATRICK J. McLAUGHLIN, OF CHICAGO, ILLINOIS.

COMBINED HEATING AND ILLUMINATING LAMP.

SPECIFICATION forming part of Letters Patent No. 741,532, dated October 13, 1903.

Application filed March 9, 1903. Serial No. 146,932. (No model.)

*To all whom it may concern:*

Be it known that I, PATRICK J. McLAUGHLIN, a citizen of the United States, residing at Chicago, in the county of Cook and State of Illinois, have invented certain new and useful Improvements in a Combined Heating and Illuminating Lamp, of which the following is a specification.

This invention relates to improvements in a heating and illuminating lamp; and it consists in certain peculiarities of the construction, novel arrangement, and operation of the various parts thereof, as will be hereinafter more fully set forth and specifically claimed.

The object of my invention is to provide a lamp for illuminating purposes which shall be so constructed that it will generate a large amount of heat units from the same oil that is consumed in furnishing light.

Another object of the invention is to construct the device for general utility purposes, such as heating water, making coffee or tea, and the like.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a front or face view in elevation of a combined heating and illuminating lamp embodying my invention, showing it provided with arms to be used for drying purposes. Fig. 2 is a central vertical sectional view showing the lamp in dotted lines. Fig. 3 is a plan sectional view with the lamp removed, taken on line 3 3 of Fig. 1, looking in the direction indicated by the arrows. Fig. 4 is a similar view taken on line 4 4 of Fig. 2 looking in the direction indicated by the arrows; and Fig. 5 is a view, partly in section and partly in elevation, of the upper portion of the cylinder or drum.

Like numerals of reference refer to corresponding parts throughout the different views of the drawings.

The reference-numeral 10 represents the base, which is shown as being circular in form, but may be of any suitable size, form, and material, and is supported by means of legs 11, which project outwardly therefrom, as shown. The base 10 is formed or provided at its upper portion with a horizontal floor 12, which is formed with a circular opening 13 to receive the bowl 14 of the lamp, which is preferably of the central-draft type or is formed with an opening 15 extending vertically through the bowl and burner 16 on which the chimney 17 is mounted, so as to allow air to pass therethrough. As is clearly shown in Figs. 2 and 3 of the drawings, the floor 12 of the base is provided with another opening 18 for the admission of air to the air-chamber 19, which is formed by the rear portion of the cylinder 20 and a segmental vertical partition 21, which extends upwardly to near the top of the lamp-chimney. The lower front portion of the cylinder 20 is cut away, as at 22, to expose the lamp, so that the light thereof may be reflected by the outer surface of the partition 21, which may be made of any suitable material and polished or otherwise provided with a reflecting-surface adjacent to the lamp. By cutting away the lower portion of the cylinder, as shown and above stated, it is apparent that the lamp may be easily placed in the base or holder therefor and readily removed therefrom.

By reference to Figs. 1 and 2 of the drawings it will be seen that the reflector or partition 21 extends upwardly a little beyond a horizontal line located at the upper portion of the cut-away part of the cylinder. Located within the cylinder and connected at its lower edge to the inner surface of the rear portion thereof is a segmental trunco-cone-shaped hood or deflector 23, which, as is shown in Fig. 4, covers about half of the interior of the cylinder 20 and has in its central portion a semicircular recess 24, located just above and slightly to one side of the lamp-chimney. The upper portion of the cylinder 20 is provided with a series of openings 25 and just above said openings has located therein a horizontal partition 26, on which a teapot 27 or other vessel the contents of which it is desired to heat or cook may rest. Fitted on the upper end of the cylinder 20 is a cover 28, which may be removed, if desired. To afford means for drying towels, napkins, and other articles, I may provide the cylinder 20 near its upper portion with a series of bearings 29 to receive the downturned ends of arms 30, on which towels 31 and the like may be hung.

In Fig. 5 of the drawings I have illustrated a modification in the construction of the cylinder, which consists in placing horizontally below the partition 26 a coil of pipe 32, one end of which may be connected to a tank 33 or other source of water-supply and the other end provided with a faucet 34, through which the water may be drawn off. This coil is shown as being supported by means of brackets 35, secured to the walls of the cylinder, but may be supported in any suitable manner.

From the foregoing and by reference to the drawings it will be seen and clearly understood that when the wick of the lamp is lighted a sufficient amount of air for combustion purposes will be drawn through the central opening 15 in the lamp-bowl, and as it is heated and escapes through the top of the lamp-chimney a draft will be created through the opening 18 in the base and air-chamber 19, from whence it will be deflected, as indicated by the arrows, by means of the hood or the deflector 23, so as to pass over the top of the reflector-partition 21 and lamp-chimney, thereby becoming heated while it is retained in the upper portion of the cylinder, from which it will pass out through the openings 25 thereof, in which operation the partition 26 and compartment afforded by the cover 28 will become heated to a high degree, so as to allow water in a vessel to be heated or articles cooked. It is apparent that by using the coil of pipe 32 water therein may be easily heated and drawn therefrom.

Having thus fully described my invention, what I claim as new, and desire to secure by Letters Patent, is—

1. In a combined heating and illuminating lamp, the combination with the base provided with a horizontal floor or partition having an opening, of a cylinder secured to the base and provided near its upper end with a series of openings and having its lower front portion cut away, a vertical partition resting at its lower end on the floor of the base near the inner edge of the opening thereof, a lamp resting on the base and a cover on the top of the cylinder, substantially as described.

2. The combination with the base having a floor provided with an opening, of a cylinder resting on the base and provided near its upper end with a series of openings and having its lower front portion cut away, a partition resting at its lower end on the floor of the base and secured at its edges to the cylinder, a horizontal partition located in the upper end of the cylinder above the openings therein, and a lamp located on the base, substantially as described.

3. The combination with the base having a floor provided with an opening to receive the lamp-bowl and an opening for the admission of air, of a cylinder resting on the base and provided near its upper end with a series of openings and having its front lower portion cut away, a partition resting at its lower end on the floor of the base between the openings therein, and having its edges secured to the cylinder, a deflector secured to the inner surface of the cylinder and extending over the partition, a horizontal partition located in the upper portion of the cylinder above the opening therein, substantially as described.

4. The combination with the base having a floor provided with an opening for the admission of air, a cylinder resting on the base and having its lower front portion cut away, a partition located vertically in the cylinder and resting at its lower end on the floor thereof near the inner edge of said opening, a deflector located in the cylinder and projecting above the said partition, and a lamp located on the floor of the base, substantially as described.

5. The combination with the base having a floor provided with an opening for the admission of air, of a cylinder located thereon and provided at its upper end with a series of openings and having its lower front portion cut away, a vertical partition located within the cylinder and resting at its lower end on the base and having its sides secured to the cylinder, a partition horizontally located in the cylinder above the openings therein, a coil of pipe communicating at one of its ends with a source of water and having at its other end a faucet, said coil located in the cylinder beneath the horizontal partition, a deflector located in the cylinder and projecting above the vertical partition, and a lamp located on the base, substantially as described.

PATRICK J. McLAUGHLIN.

Witnesses:
CHAS. C. TILLMAN,
A. GUSTAFSON.